United States Patent
Langenfeld

(10) Patent No.: US 11,926,175 B2
(45) Date of Patent: Mar. 12, 2024

(54) MAGNETIC APPARATUS FOR CENTERING CASTER WHEELS

(71) Applicant: DEKA Products Limited Partnership, Manchester, NH (US)

(72) Inventor: Christopher C. Langenfeld, Nashua, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 892 days.

(21) Appl. No.: 16/983,732

(22) Filed: Aug. 3, 2020

(65) Prior Publication Data
US 2021/0031561 A1    Feb. 4, 2021

Related U.S. Application Data

(60) Provisional application No. 62/881,716, filed on Aug. 1, 2019.

(51) Int. Cl.
| | | |
|---|---|---|
| B60B 33/02 | (2006.01) | |
| B60P 3/00 | (2006.01) | |
| G05D 1/00 | (2006.01) | |
| G05D 1/02 | (2020.01) | |

(52) U.S. Cl.
CPC .............. *B60B 33/02* (2013.01); *B60P 3/007* (2013.01); *G05D 1/0231* (2013.01)

(58) Field of Classification Search
CPC ..... B60B 33/02; B60B 33/021; B60B 33/006; B60B 33/00; B60B 33/028; B60B 33/026; B60B 2900/931; B60P 3/007; G05D 1/0231

See application file for complete search history.

(56) References Cited

U.S. PATENT DOCUMENTS

| | | | |
|---|---|---|---|
| 4,054,965 A | 10/1977 | Vig et al. | |
| 4,212,093 A | 7/1980 | Lombard | |
| 4,887,824 A | 12/1989 | Zatlin | |
| 6,134,748 A | 10/2000 | Kuo | |
| 7,383,611 B2 * | 6/2008 | Foster | B60B 33/0039 16/21 |
| 8,875,855 B2 | 11/2014 | Sener et al. | |
| 9,169,003 B2 | 10/2015 | Young et al. | |
| 9,649,881 B2 | 5/2017 | Warncke et al. | |
| 10,661,605 B2 * | 5/2020 | Hugues | B60B 33/006 |
| 11,059,373 B1 * | 7/2021 | Claretti | G01S 17/86 |

(Continued)

FOREIGN PATENT DOCUMENTS

| | | | | |
|---|---|---|---|---|
| JP | 05254306 A | 10/1993 | | |
| JP | 10264603 A | 10/1998 | | |
| WO | WO-2020147048 A1 * | 7/2020 | ............. | B62B 5/004 |

*Primary Examiner* — Kevin Hurley
*Assistant Examiner* — Abigail R Hymel
(74) *Attorney, Agent, or Firm* — William A. Bonk, III

(57) ABSTRACT

An autonomous delivery vehicle having one or more caster wheels that may be held off the ground for a portion of the time that the autonomous delivery vehicle travels. Each caster wheel is mounted in a pivot with a centering mechanism to hold the caster wheels in a design orientation. The caster wheel in the design orientation maximizes the view of forward-looking sensors on the autonomous delivery vehicle. The centering mechanism uses magnetic attraction/repulsion to center the caster wheel. The centering mechanism may incorporate a plurality of permanent magnets and or electro-magnets.

19 Claims, 13 Drawing Sheets

(56) References Cited

U.S. PATENT DOCUMENTS

| | | | |
|---|---|---|---|
| 11,104,294 B1* | 8/2021 | Skaloud | B62D 24/04 |
| 11,360,471 B1* | 6/2022 | Kalama | H04N 23/57 |
| 11,548,373 B1* | 1/2023 | Kurczewski | B60K 11/08 |
| 2011/0162166 A1* | 7/2011 | Cooper | B60B 33/0021 |
| | | | 16/45 |
| 2016/0059628 A1 | 3/2016 | Degrace et al. | |
| 2016/0355053 A1* | 12/2016 | Warncke | B60B 33/006 |
| 2017/0119607 A1* | 5/2017 | Derenne | B60B 33/0092 |
| 2020/0163278 A1* | 5/2020 | Fay, II | B60B 33/04 |

* cited by examiner

MAGNETIC APPARATUS FOR CENTERING CASTER WHEELS

CROSS REFERENCE TO RELATED APPLICATIONS

This utility patent application claims the benefit of U.S. Provisional Patent Application Ser. No. 62/881,716 filed Aug. 1, 2019, entitled MAGNETIC APPARATUS FOR CENTERING CASTER WHEELS.

BACKGROUND

The present teachings relate generally to autonomous delivery vehicles, and more specifically to the control of the casters wheels not in contact with the ground. Autonomous Delivery Vehicles (ADV) may securely deliver one or more packages or items to a desired location. The ADV needs to orient itself within its environment and navigate the streets, sidewalks, open spaces to reach a desired destination. In addition, the ADV needs to identify and avoid obstacles and recognize changes in travel surface. Obstacle and/or surface detection relies on short range sensors include stereo-cameras, short-range radar, ultra-sonic etc. These short-range sensors typically observe the area or volume around the ADV out to several meters. In order to improve obstacle/surface detection, the movement of ADV components within the field of view of the short-range sensors should be limited. Swivel casters rotate or pivot about an axis approximately perpendicular to the wheel axis. The pivoting of the swivel casters allows the caster wheel contacting the ground to align with the direction of travel. In cases, where the swivel caster is lifted off the ground, the caster may pivot freely and move within the FOV of the front and corner short-range sensors. There is a need for the/an apparatus to encourage the swivel casters to hold a desired orientation relative to the ADV.

SUMMARY

The vehicle of the present teachings includes a caster. The caster is mounted to the vehicle via a first part, A second part that includes the caster wheel is rotatably mounted within the first part, the second part rotating about an axis and having a rotational position with respect to the first part, and the second part having a design position. Magnetic means apply magnetic force on the second part, where the magnetic force increasing with an angular difference between the rotational position and the design position. The magnetic means include plurality of permanent magnets mounted about the axis in the second part and a fixed plurality of magnets mounted in the first part. The fixed plurality are concentric to the rotary plurality. The fixed plurality applying a magnetic force on the magnets in the second part. The magnetic force between the first part and the second part may increase proportionally with the angular difference. The fixed plurality of elements may be a fixed plurality of permanent magnets.

In some configurations, the fixed plurality of elements in the first part may be electro-magnets. The electro-magnets may be connected to a controller. The controller apply a voltage to each electro-magnet to drive the second part to a desired rotary position.

The poles of the fixed plurality in the first part and the magnetic poles of the rotary plurality in the second part may be axially aligned with the rotary axis of the second part. In another configuration, the poles of the fixed plurality and rotary plurality may be arranged radially about the rotary axis of the second part. The rotary plurality of magnets in the second part may comprise two or more rows of magnets.

The rotary plurality of permanent magnets may consist of two groups. The first group of magnets in the rotary plurality are oriented to face the north pole away from the caster wheel, the second group is oriented to face the north pole toward the caster wheel. In a configuration, the first group is arranged on a first sector and the second group is arranged on a second sector that does not overlap with the first sector.

The vehicle of the present teachings is an autonomous delivery vehicle (ADV) that navigates one or more surfaces. The ADV includes a container base and a power based to move the container across one or more surfaces. The container bases includes a controller, and a camera with a field of view. The power includes a base structure with a second controller, two clusters disposed laterally on each side of a base, each cluster rotatably connected to the base, each cluster including a front wheel and a back wheel and two casters, each caster connected to a caster arm with a caster mount, the caster arms mounted each side of the base. The casters are disposed partially within the camera's field of view, the caster mount comprise a centering device that urges the casters to a predetermined orientation when the casters are not in contact with the ground.

The centering device in the ADV comprises a first part mounted to the caster arm and a second part mounted to a caster and rotatably mounted within the first part. The second part rotating about an axis and having a rotational position with respect to the first part. The second part having a design rotational position. The centering device further includes a magnetic means that applies a magnetic force on second part, the magnetic force increasing with an angular difference between a rotational position and the design position. The magnetic means comprising a rotary plurality of permanent magnets mounted in the second part about the axis and a fixed plurality of magnets mounted in the first part, the elements are concentric to the axis. The magnetic force between the first part and the second part may increase proportionally with the angular difference. The fixed plurality of elements may be a fixed plurality of permanent magnets.

In some configurations, the fixed plurality of elements in the first part may be electro-magnets. The electro-magnets may be connected to a controller. The controller apply an electrical signal to each electro-magnet to drive the second part to a desired rotary position.

The permanent magnets of the rotary plurality may be axially aligned with the fixed plurality magnets in the first part. In another configuration the permanent magnets of the rotary plurality may be oriented radially about the axis. The rotary plurality of magnets in the second part may comprise two or more rows of magnets.

A configuration of the ADV may include a centering device on the casters that includes a first part mounted to the caster arm, a second part mounted to a caster, where the second part rotates about an axis and has a rotational position with respect to the first part. Furthermore the second part has a design rotational position. The centering device includes magnetic means to apply a magnetic force on second part that increases with angular difference between a rotational position and the design position.

BRIEF DESCRIPTION OF THE DRAWINGS

The present teachings will be more readily understood by reference to the following description, taken with the accompanying drawings, in which.

DETAILED DESCRIPTION

Figure 1:
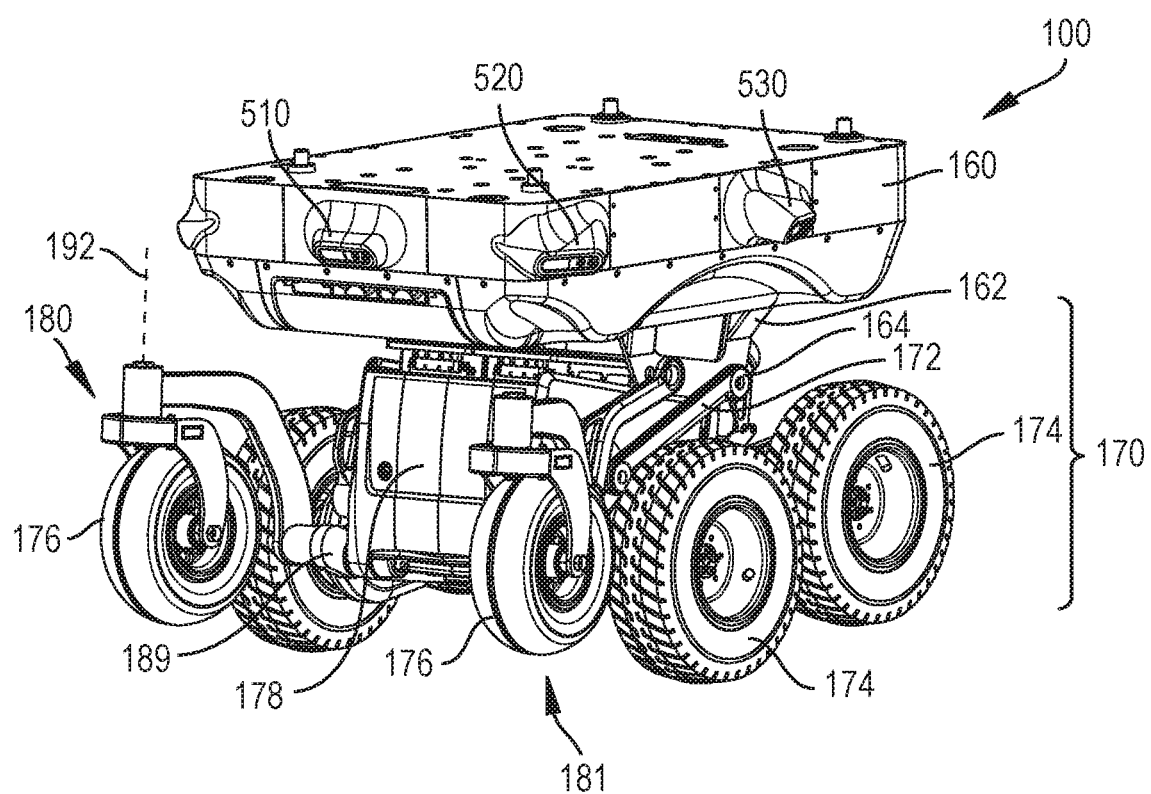
FIG. 1 is an isometric view of the lower portion of an autonomous delivery vehicle (ADV).
Figure 2A:
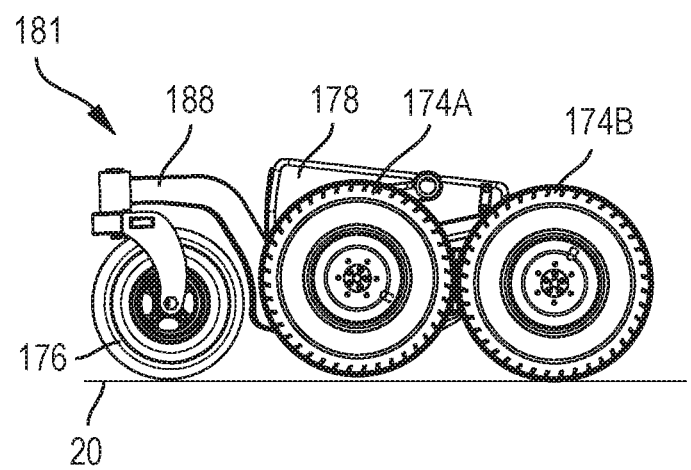
FIG. 2A-2D are isometric views of the ADV power base.
Figure 2B:
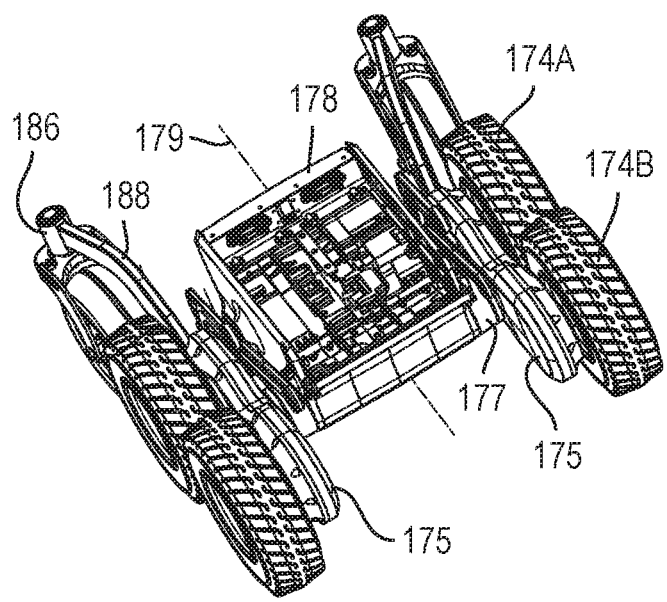
Figure 2C:
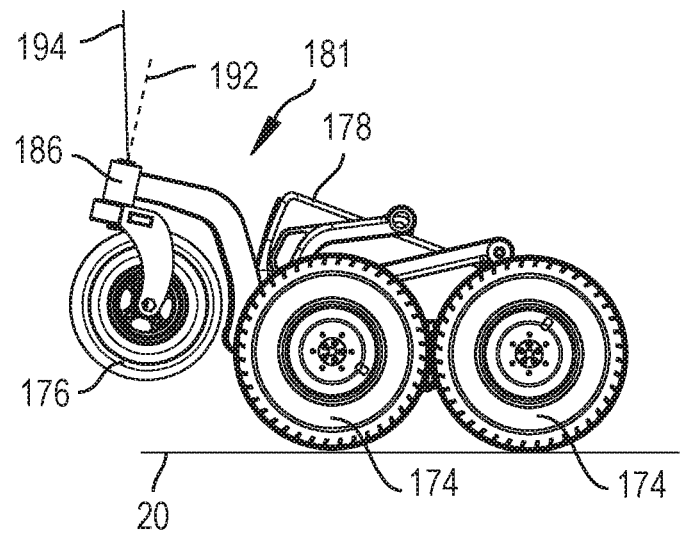
Figure 2D:
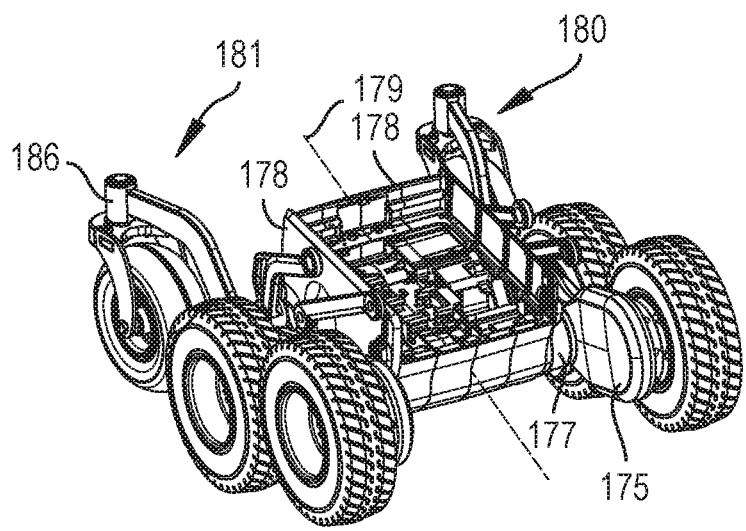

The autonomous delivery vehicle (ADV) 100 in FIG. 1 may deliver cargo and/or perform other functions involving autonomously navigating to a desired location. In some applications, the ADV 100 of FIG. 1 may be remotely guided. A cargo container (not shown) is mounted on the cargo platform 160, which is mechanically connected to the power base 170. The power base 170 includes the four powered wheels 174 and two caster wheels 176. The power base 170 provides speed and directional control to move the ADV 100 along the ground and over obstacles including curbs and other discontinuous surface features.

The cargo platform 160 is connected to the power base 170 through two U-frames 162. Each U-frame 162 is rigidly attached to the structure of the cargo platform 160 and includes two holes that allow a rotatable joint 164 to be formed with the end of each arm 172 on the power base 170. The power base 170 controls the rotational position of the arms and thus controls the height and attitude of the cargo platform 160. The ADV 100 includes one or more processors to receive data, navigate a path and select the direction and speed of the power base 170. The processors receive data from the short-range sensors 510, 520, 530 in the cargo platform 160 and other sensors not shown in FIG. 1.

Figure 4:
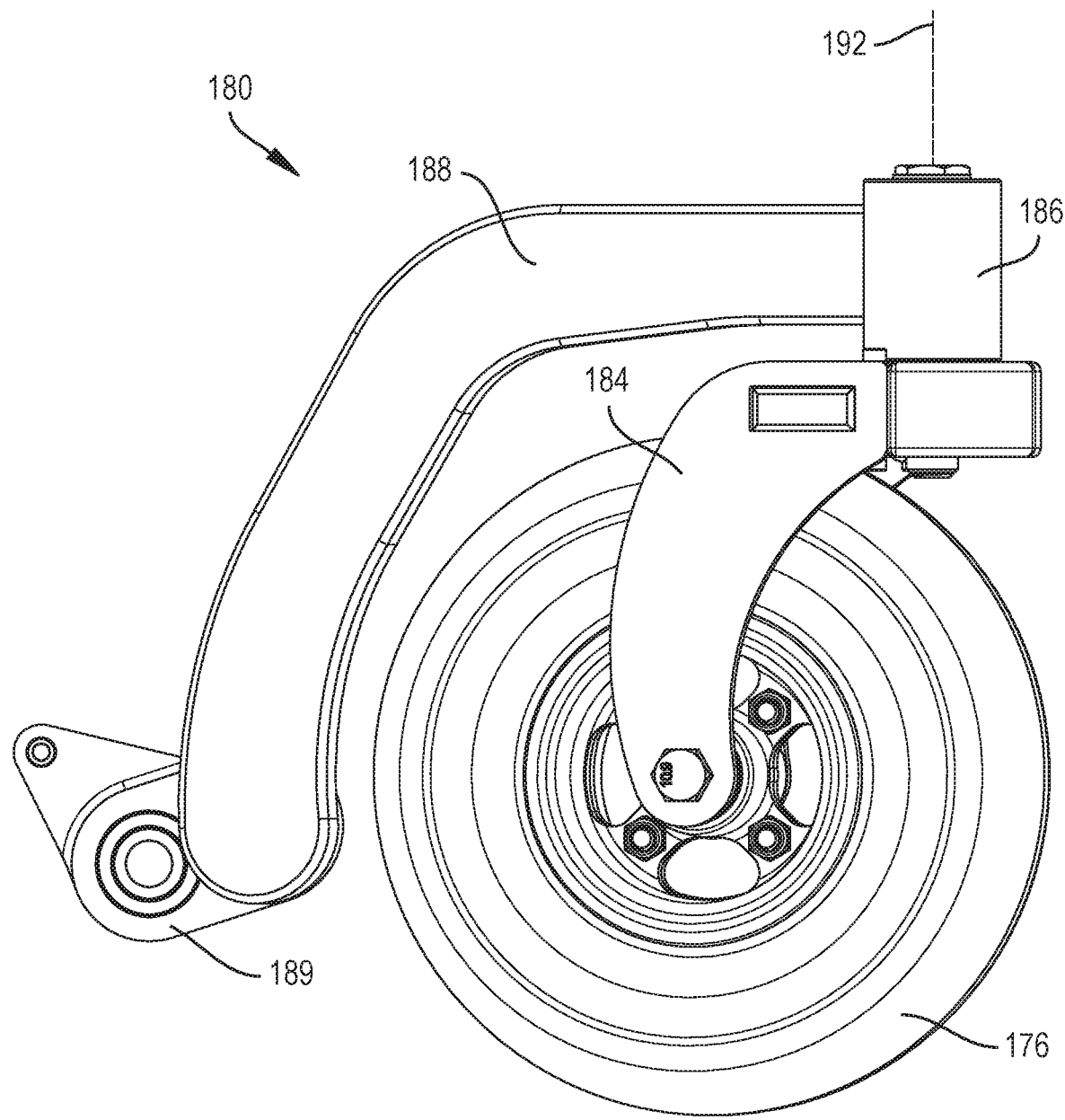
FIG. 4 is a side view of a caster assembly.

The caster assemblies 180, 181 are mounted to the power base body 178. The caster assemblies comprise a left caster assembly 181 and a right caster assembly 180. Referring now to FIG. 4, each caster assembly comprises a caster wheel 176, a caster frame 184, a caster pivot 186, a caster arm 188 and a mounting element 189. The caster wheel 176 is rotatably mounted in the caster frame 184. The caster frame 184 is attached to the caster arm 188 via the caster pivot 186 which allows the caster frame 184 and caster wheel 176 pivot about the caster pivot axis 192. Allowing the caster wheel 176 to pivot about the axis of the caster pivot 186 facilitates the wheel aligning with the direction of travel, when the caster wheel 176 is in contact with the ground.

Referring now to FIGS. 2A-2D, the power base 170 can operate in at least two configurations or modes. In standard mode, depicted in FIGS. 2A-2B, the front of the two clusters 175 are rotated upward to lift the front wheel 174A off the ground 20. The clusters 175 comprise a structure that connects the driven wheels 174A, 174B to the base 178. The cluster 175 provide motive power to the wheels. The cluster 175 rotates about hub 177 which connects the cluster 175 to the power base body 178. Rotating the front of the cluster up, brings the caster wheels 176 in contact with the ground 20 so the power base 170 and the ADV 100 rest on the back powered wheels 175B and the caster wheels 176. In standard mode, contact with the grown and motion of the power base 170 cause caster frame 184 and wheel 176 to align with the direction of motion.

In four-wheel model, depicted in FIGS. 4C-4D, the clusters 175 are rotated to put both the front 174A and back powered wheels 174B on the ground 20 and lift the wheels 176 off the ground. In four-wheel mode, the caster assemblies 180, 181 are tilted back so that the rotation axis of the pivot 192 tilts backward from a vertical axis 194. The pivot 192 and the vertical axis 194 define a pivot plane. The backward tilt of the pivot axis 192 causes the caster frame 176 under the influence of gravity to align approximately (+15 degrees) with a center plane of the base 176. The base center plane is a vertical plane that comprises the base centerline 179. The tilt of axis 192, alignment of the pivot plane, and gravity also cause the caster wheel 176 to approximately align with the clusters 175 and with the centerline 179 of the power base body 178. However, the caster frames 184 and the caster wheel 176 may swing or rotate about pivot 186 in response to motion of the ADV 100.

Figure 3A:
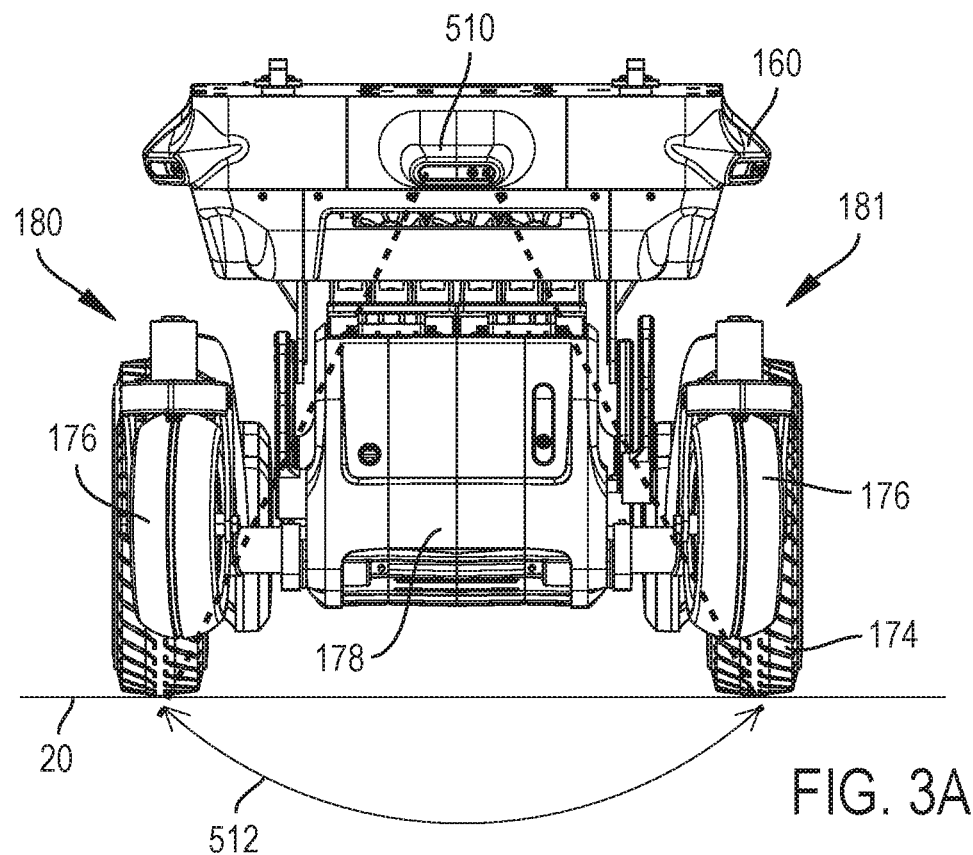
FIG. 3A-3B are front views of the ADV lower portion.
Figure 3B:
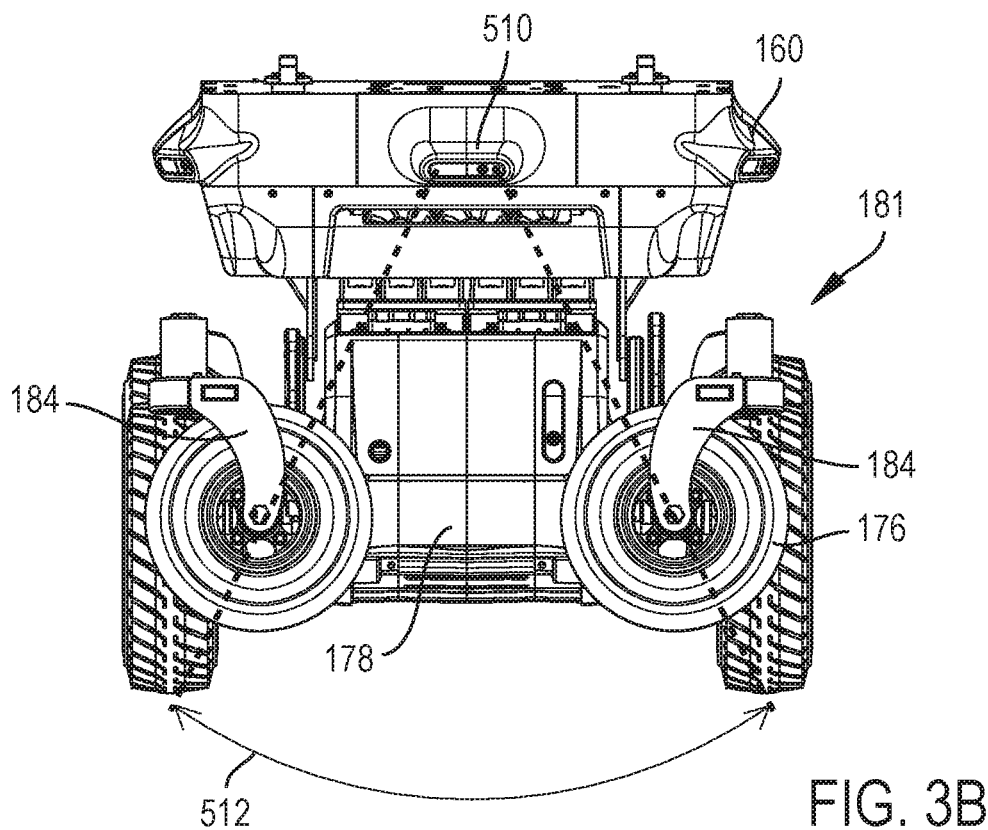

Referring now to FIGS. 3A, 3B, the swinging motion of the caster frame and wheel 184, 176 may interfere with the field of view (FOV) 512 of the forward looking sensors including sensor 510. Movement of the caster wheels within the FOV 512 of the forward looking sensors may interfere with the detection of obstacles and surface type. It is beneficial to obstacle detection to minimize the pivoting movement of the caster wheels 176 and to encourage the caster wheels into an orientation aligned with the centerline of the power base body 178. Aligning the caster wheels 176 with the power base body 178 has an additional benefit of having the wheels generally pointing in the right direction when the power base 170 transitions back to standard mode. The power base may 170 wobble or move unpredictably if the casters are not approximately aligned with the base when the caster wheels 176 contact the ground 20 as the power base transitions to standard mode.

Figure 5A:
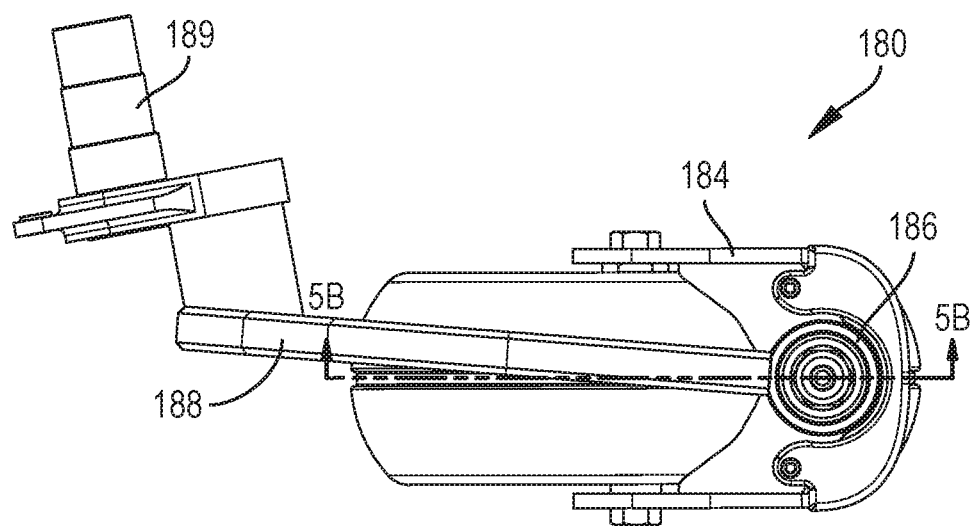
FIG. 5A is a top view of a caster assembly.
Figure 5B:
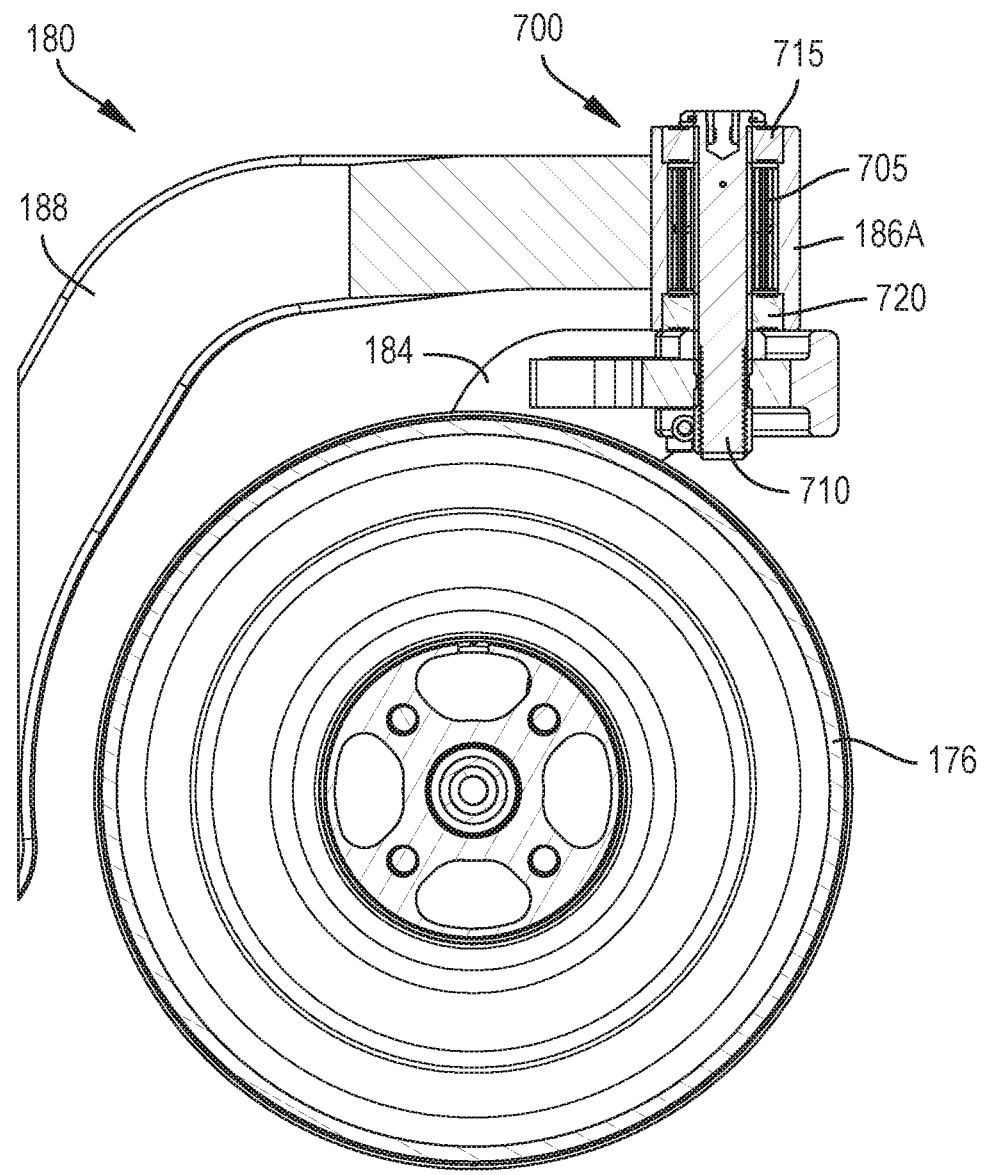
FIG. 5B is a cut-away view of the caster assembly.

Referring now FIGS. 5A, 5B, the centering mechanism 700, comprising an actuator 705, a kingpin 710 and bearings 715, 720, is located in the caster pivot 186. The centering mechanism 700 acts to align the caster frame 184 and wheel 176 with the center plane or centerline 179 (FIG. 2D) of the power base body 178. Referring again to FIGS. 5A, 5B, the centering mechanism 700 acts to apply a restoring force to the caster frame 184 when the frame pivots away from a pre-defined design position. In an example, the design position has the caster frame and wheel 184, 176 aligned with the center plane of the power base body 178. The kingpin 710 is fixedly mounted to the caster frame 184 and rotationally mounted to the shell of the caster pivot 186 via bearings 715, 720. The actuator 705 applies a restoring torque to the kingpin 710 that increases as the kingpin 710, caster frame and wheel 184, 176 rotate further and further from the design position. In one example, the restoring force is zero when the caster frame 184 and wheel 176 are in the preferred position. The restoring force reaches a maximum when the caster frame 184 and wheel 176 are opposite or 180 degrees from the design position. If the caster rotates past 180 degrees, the restoring force decreases. Thus, the caster frame 184 and wheel 176 will rotate to the design position in the most direct direction rather than retracing its path past the 180 degree position.

The actuator 705 comprises a stator attached to the caster pivot shell 186A and a rotor attached to the kingpin 710. The actuator 705 further comprises a plurality of magnets that provide a restoring force to the kingpin that increases with rotation away from the design position. A magnetic actuator 705 is preferred to a spring-based centering mechanism as a spring-based centering mechanism will have a limited range of rotation that can create instability in the caster wheel position when the wheel is on the ground. In addition, the mechanical spring may prevent the caster wheel from turning more than 180 degrees, which is needed when the ADV 100 reverses direction.

Prior art including U.S. Pat. Nos. 9,649,881 and 8,875,855 include pairs of magnets, with one on the rotating portion and the other magnet on the static portion of caster that encourage a caster wheel and frame to remain in a given rotary position. The pairs of magnets are arranged with opposite poles facing each other to create an attractive magnetic force between the pairs. One theory of forces between magnets holds that magnets are dipoles and the attractive/repulsive force between magnets varies with the inverse of the distance cubed. That is to say doubling the distance between the two magnets will reduce the forces between them to one eighth the original force. Therefore the magnets disclosed in the prior art will have little effect on the casters once when the casters have been displaced more than a short distance from the preferred orientation.

Figures 6A, 6B:
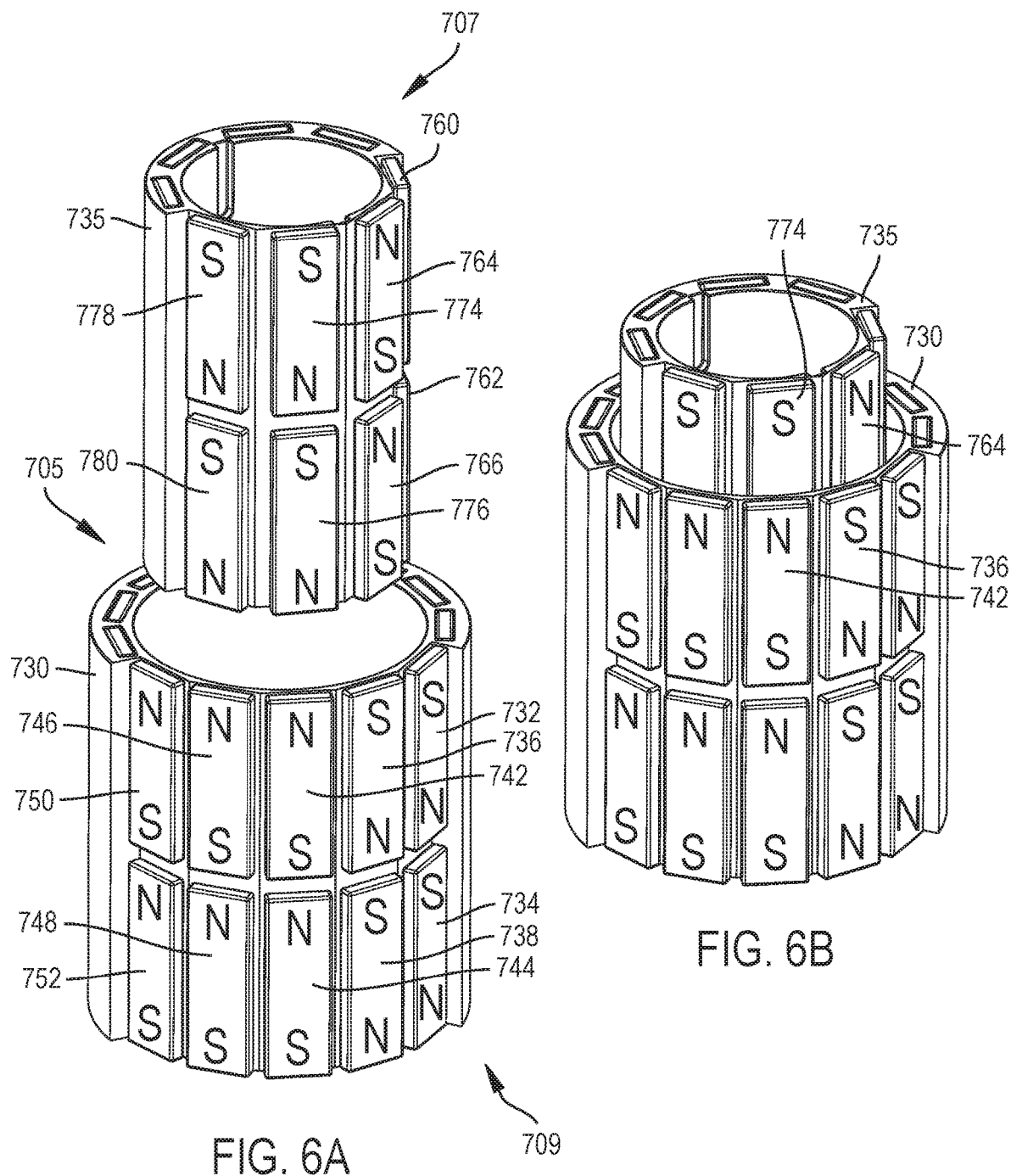
FIG. 6A, 6B are views of the actuator components.

FIGS. 6A and 6B show an embodiment of the actuator 705 comprising a stator 709 and a rotor 707 where the rotor has been displaces axially to expose the elements of the stator and rotor. In FIG. 6A, the rotor 707 is fully displaced out of the stator 709. In FIG. 6B, the rotor 707 is significantly but not fully inserted into the stator 709. The stator 709 is composed of a shell 730 and a plurality of magnets 732-752 that are oriented along the pivot axis or kingpin (not shown). The rotor 707 comprises a shell 735 and a plurality of magnets 760-780. As described elsewhere, the rotor 707 is rigidly attached to the kingpin and the kingpin is rigidly attached to the caster frame. Thus, forces applied to the rotor are applied to the caster frame. The stator is attached to the caster pivot shell as described elsewhere.

The stator shell 730 and the rotor shell 735 are shown in FIGS. 6A, 6B with a section cutaway to reveal the location and orientation of the magnets. The magnets may to attached to the rotor shell 735 and stator shell 730 with an adhesive or held in place mechanically using one or more of the following mechanical methods including, but limited to deforming the shells 730, 735 after magnet insertion, screws and pins, and clips that hold the magnets in the shell slots.

The magnets in the stator 709 are arranged in two rows around the circumference of the shell 735. In alternative embodiments, the stator 709 may contain a single row of magnets or more than 2 rows of magnets. The restoring force will increase with the number of rows assuming equivalent magnets. The magnets are arranged so a first set of the magnets have their poles oriented in one direction, while the rest of the magnets are oriented in the opposite direction. Referring to FIG. 6A, a first set of the stator magnets 732, 734, 736, 738, and others not visible are oriented so the south (S) pole is upward. A second set of the stator magnets 742, 744, 746, 748, 750, 752, and others not visible are oriented so the north (N) pole is upward. All the magnets in the stator are in either the first or the second set. In one example, the first set accounts for approximately half the magnets. If the number of magnets around the circumference is not an even number, then the first set will comprise one magnet per row more or less than half the magnets. In an example, the first set of magnets are grouped together and the second set are grouped together and the two groups are not intermingled. In other examples, the first or second set of magnets may occupy different fractions of the circumferences such as a quarter, a third, a sixth or an eighth. However to sum of the first and second sets will occupy the full circumference of the rotor/stator.

Continuing to refer to FIG. 6A, the rotor 707 comprises a first set of rotor magnets 760, 762, 764, 766 where the magnets are oriented so the north (N) pole is upward and a second set 774, 776, 778, 780, where the magnets are oriented so the south (S) pole is upward. Similar to the stator, the first rotor set accounts for approximately half the magnets on the rotor and the second rotor set accounts for the rest of the magnets on the rotor.

The rotor 707 and stator 709 in FIGS. 6A, 6B are shown with respect to each other in the design position. As noted elsewhere, rotation of the rotor 707 away from the design position results in an increasing restoring force. At the design position, shown in FIG. 6A, the first set of the rotor magnets 760, 762, 764, 766 are oriented so the north (N) pole are directly across from the first set of the stator magnets 732, 734, 736 and 738 that are oriented with the south (S) pole upward. At the same time the second set of the rotor magnets 774, 776, 778, 780 are oriented with the south (S) pole upward are arranged opposite the second set of the stator magnets 742, 744, 746, 748, 750, 752 that are oriented with the north (N) pole upward. Arranging opposite poles of the stator magnets and the stator poles across the gap between the stator and rotor crate an attraction force that tends to hold the rotor 707 in the design position.

In an example, the design position is where all the stator magnets are across the gap from a rotor magnet of the opposite orientation or polarity. In another example, due to an uneven number of magnets around the rotor and or sensor, the design position occurs when the fewest possible stator magnets are across the gap from a rotor magnet with the same polarity or orientation.

Figure 7A:
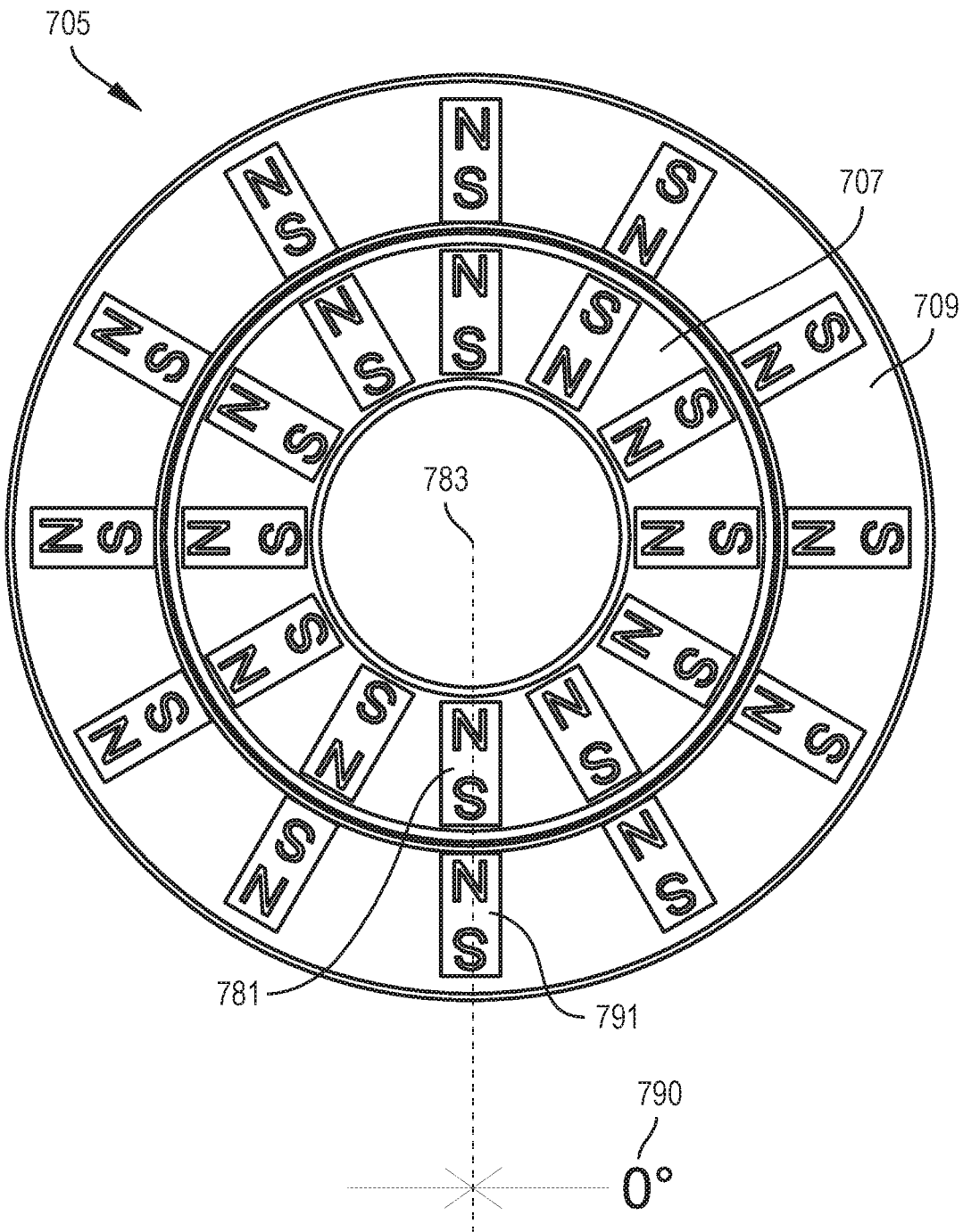
FIG. 7A-7C are schematic views of the actuator.
Figure 7B:
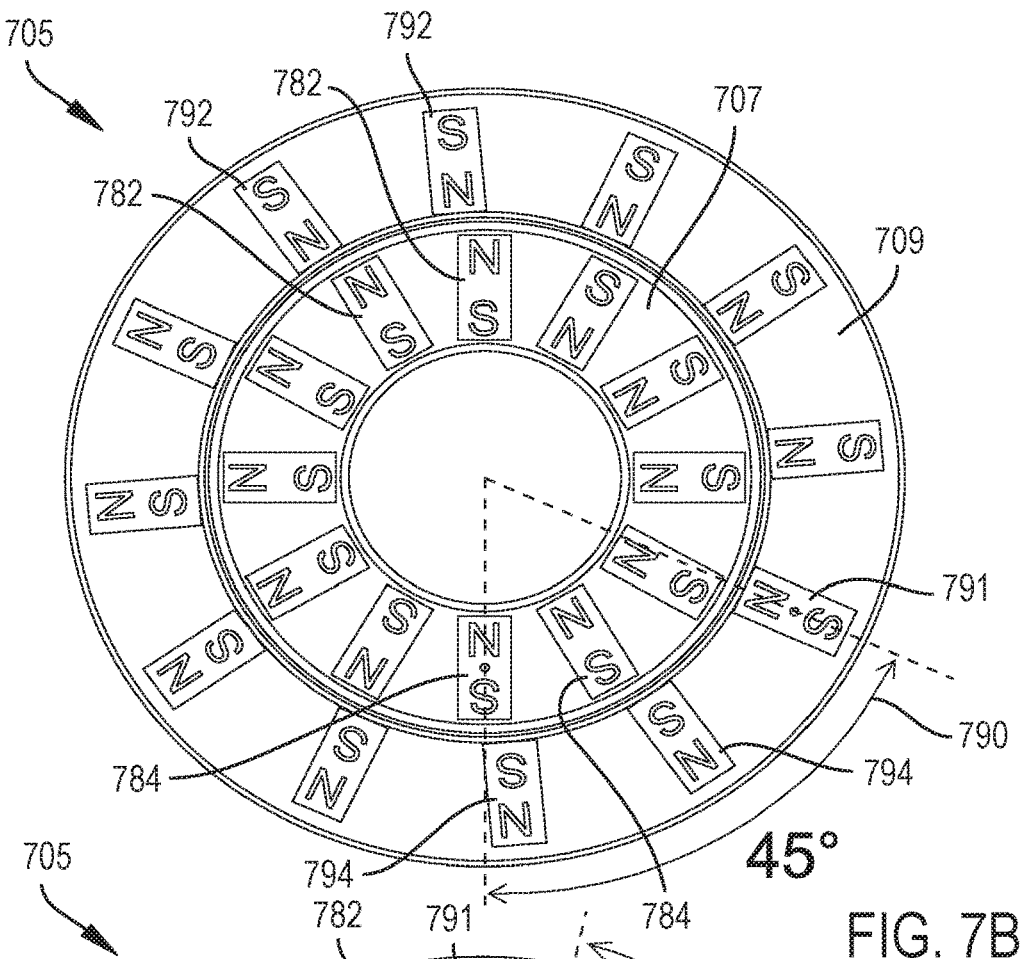
Figure 7C:
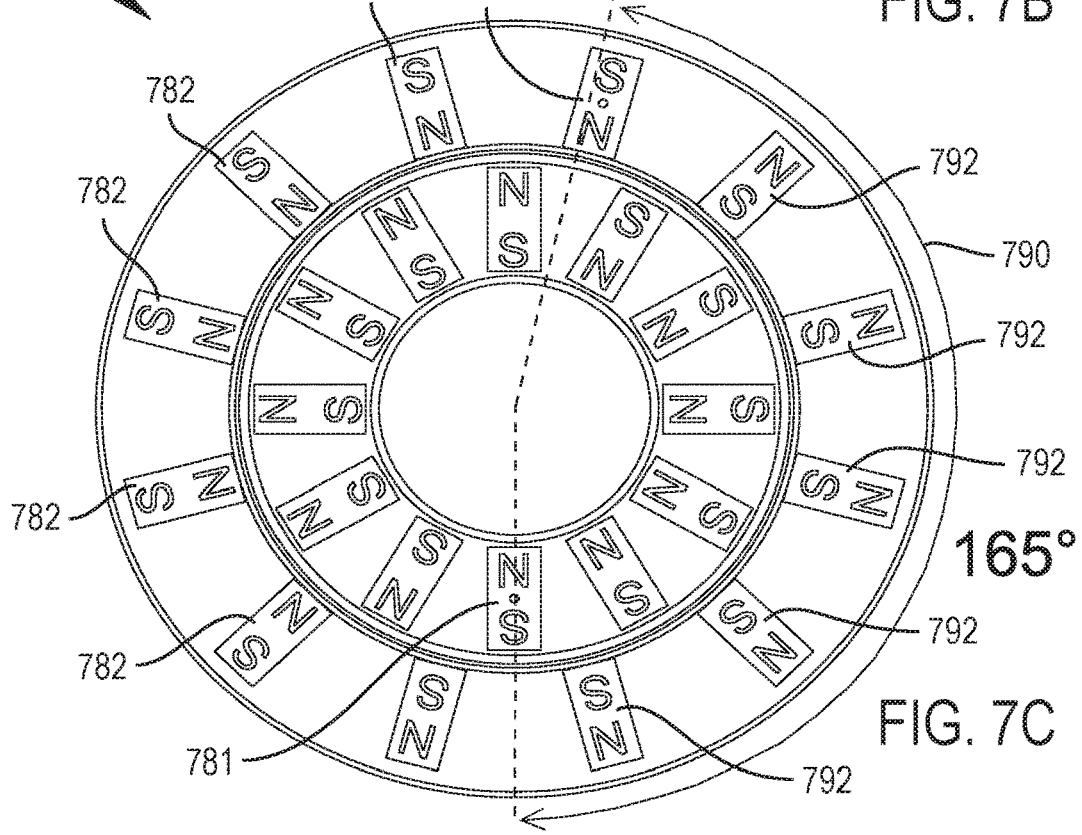

FIGS. 7A-7C show a schematic of the actuator 705 with different rotation positions of the stator 709 with regard to the rotor 707. The rotor 707 contains a plurality of magnets 781 arranged around a center point 783. In this schematic the dipole magnets are arranged radially and the pole of each magnet indicated with an S for south pole and N for north pole. The stator 709 contains a plurality of magnets 791 arranged radially about center point 783.

Referring to FIG. 7B, magnets 781 in the rotor 707 are arranged in two sets, where the first rotor set 784 have a south pole directed outwardly, while the second rotor set 782 has a north pole faced outwardly.

The stator 709 also has two sets of magnets where the first stator set 792 has north pole facing inwardly and the second stator set 794 has the south pool facing inwardly. The magnets may be arranged radially with the north and south poles oriented inward or outward or as in FIGS. 6-8, the magnets may be arranged axially with the north and south poles oriented up and down. The invention contemplates both magnet arrangements and other arrangements that allow magnets to be oriented in two directions so that magnet poles in the rotor 707 can face either the same or opposite pole in the stator 709.

In the design position, FIG. 7A, the rotor is in the design position. As shown in FIG. 7B, the rotor magnets 782, 784 are near stator magnets 792, 794 with opposite poles, so the rotor magnets are attracted to the opposite stator magnet. This attractive force resists the rotation of the rotor and thus the rotation of the king pin and caster frame and wheel.

In FIG. 7B, the rotor 707 has rotated clockwise through angle 790 inside the stator 709 from the design position. In this example, four rotor magnets (2 magnets of first rotor set 782, 2 magnets of the second rotor set 784) face stator magnets (2 magnets of first stator set 781, 2 magnets of the second stator set 794) with the same poles. Magnets 782 have outward facing north poles and at the displaced condition in FIG. 7B, the nearby stator magnets 781 are or oriented with north poles facing inward. Similarly, magnets 784 have outward facing south poles and at the displaced condition in FIG. 7B, the nearby stator magnets 794 are or oriented with south poles facing inward. Magnets 782, 784 are repelled by the stator magnets 781, 794 which turns the rotor 707 counter clockwise, back toward the design position of FIG. 7A. The repelling force would increase if the rotor continued to turn clockwise. FIG. 7C shows a more extreme displacement, where the rotor has rotated clockwise nearly a half a revolution from the design position. In the greater displacement of FIG. 7C, a total of 10 magnets 783, 784 in the rotor 707 have a pole facing outward that are near stator magnets with the same pole facing inward. The greater number of nearby opposing poles in FIG. 7C produces a larger restoring force on the rotor. Thus, the restoring force increases with the displacement of the rotor from the design position. In examples pictured in FIGS. 7B and 7C, the restoring force torques the rotor in the opposite direction from its displacement. In an example, where the rotor has turned more than 180° in a given direction, say clockwise, the restoring force will change direction and torque the rotor toward the design position in the clockwise direction as that is the direction of reducing torque. The result is that the magnetic actuator 705 will push the rotor back to the design position by the shortest possible direction.

Figure 8:
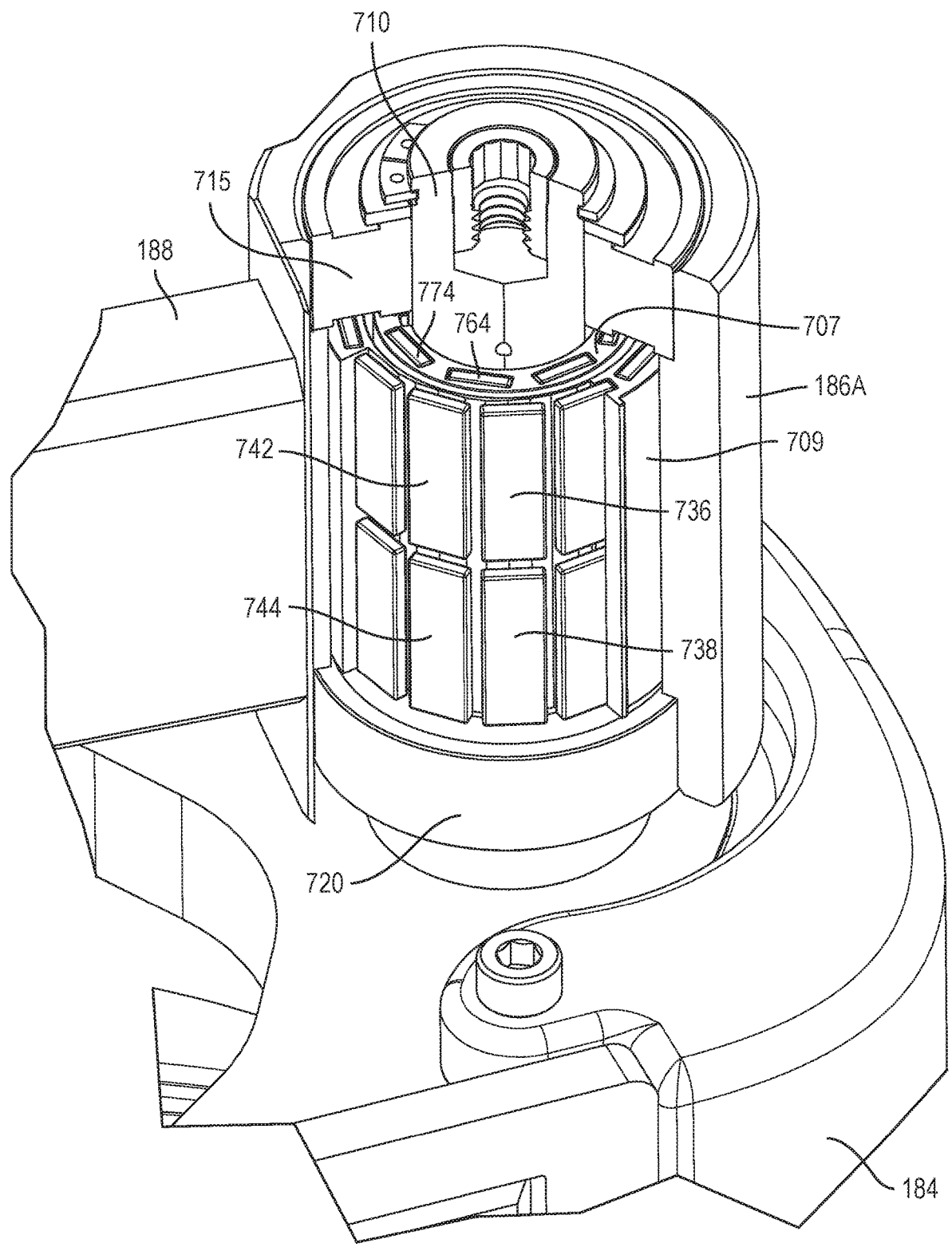
FIG. 8 is a cut-away view of the caster pivot assembly.

Referring now to FIG. 8, the rotor 707 and the stator 709 of the actuator are located within the caster pivot case 186A. The pivot shell 186A and part of the stator 709 are cut away to show stator magnets 736, 738, 742, 744. The tops of the rotor magnets 764, 744 are visible at the top of the rotor 707. The rotor 707 is attached to the kingpin 710 and via the kingpin to the caster frame 184. The rotor 707 may be attached to the kingpin 710 via a key, a pin, interlocking splines, an intermediate compliant element, a fiction fit, a thermal shrink fit or with adhesive. Similarly, the stator 709 may be attached to the pivot shell 186A with mechanical means such as a key or a fiction fit or attached with adhesive. The kingpin 710 is rotatably attached to the pivot shell 186A by bearings 710, 715. The magnetic force from stator 709 is applied to the rotor 707 and transferred to the kingpin 710 and the caster frame 184.

Figure 9A:
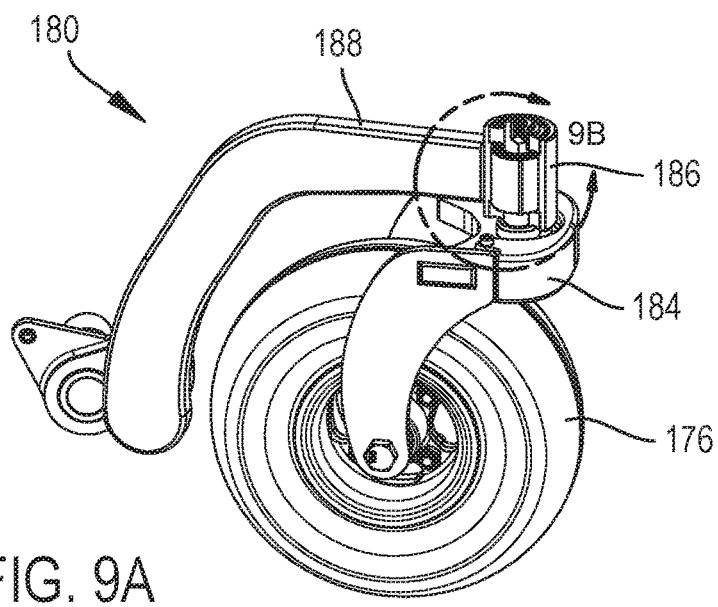
FIG. 9A-9B are views of the caster wheel aligned with the ADV body.
Figure 9B:
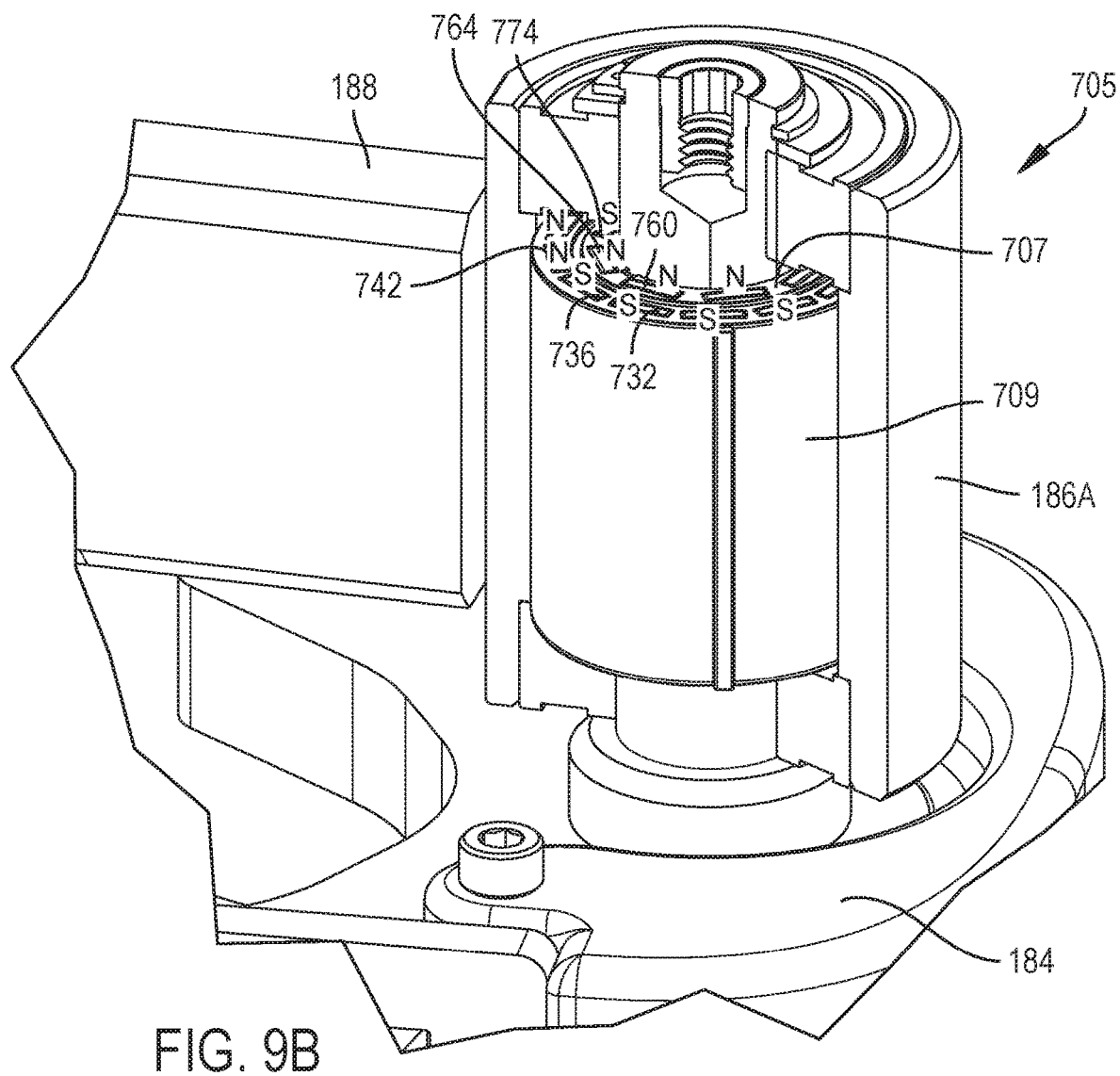

Referring now to FIGS. 9A-9D, the relationship of caster position to the stator and rotor positions is demonstrated. FIG. 9A shows the right caster assembly 180 with the caster frame and wheel 184, 176 in the design position i.e. aligned with power base (not shown). FIG. 9B is a detailed view of the caster pivot 186 where pivot shell 186A has been cut away to show orientation of the stator 709 and rotor 707 in the design position. In the design position, the stator magnets with south poles facing up 732, 736 are next to rotor magnets with the opposite pole, north, face up 760, 764. At the same time the stator magnets with the north pole facing up 742 is next to a rotor magnet with a south pole facing up 774.

Figure 9C:
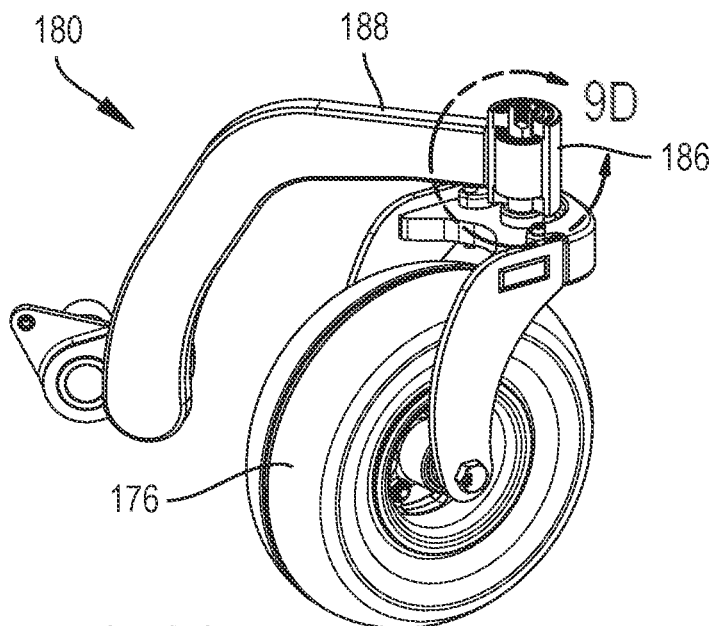
FIG. 9C-9D are views of the caster wheel not aligned with the ADV body.
Figure 9D:
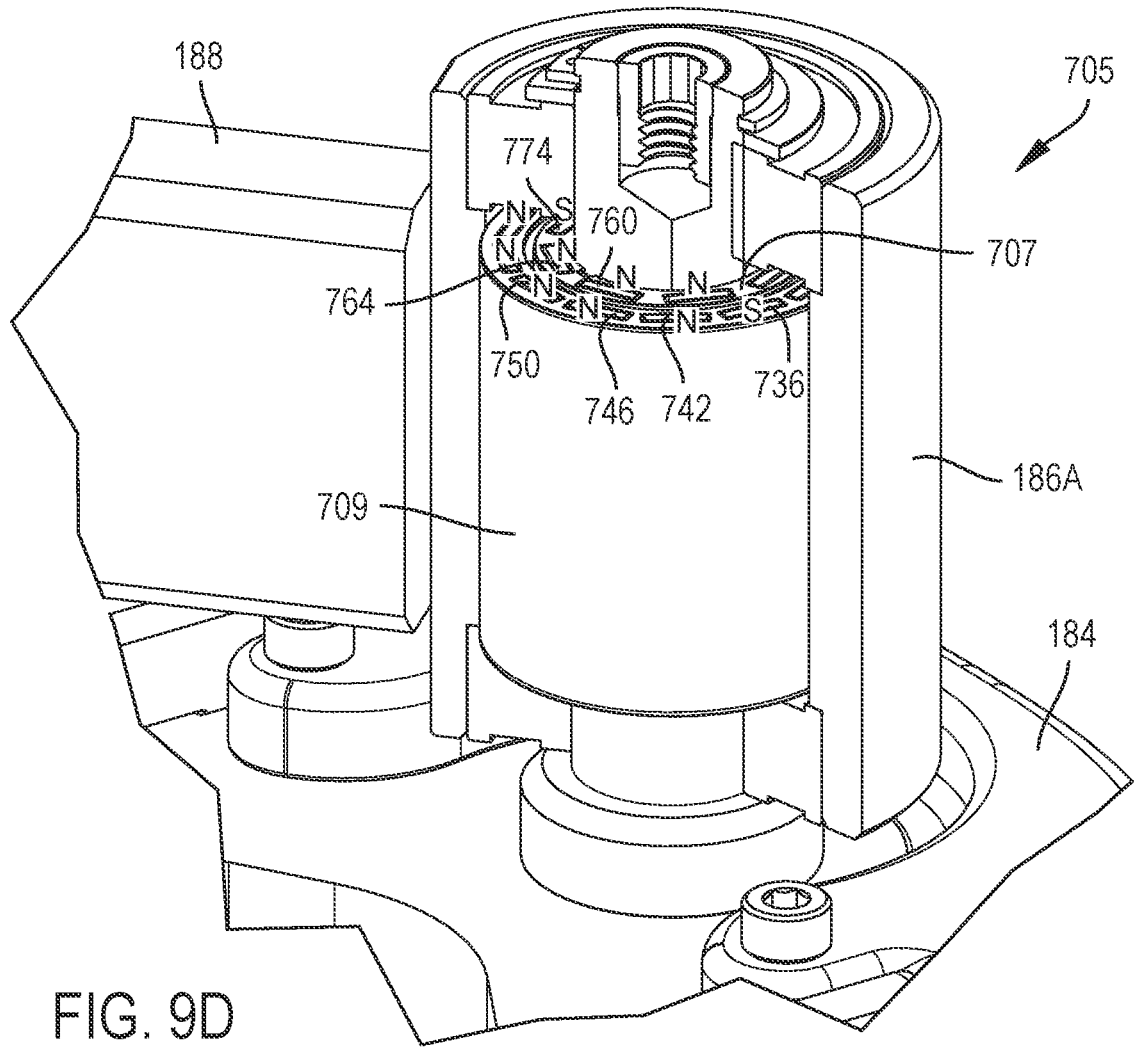

In FIG. 9C, the caster frame and wheel 184, 176 is not aligned with the power base. A detailed view of the caster pivot 186 is presented in FIG. 9D, where the pivot shell 186A has been cut-away to show the orientation of the stator 707 relative to the stator 709 when the caster fame and wheel are not in the design position. In this non-design position, one or more of the second set of stator magnets with north poles facing up 742, 746, 750 are across from the first set of rotor poles with north poles facing up 760, 764. The first set of rotor magnets are repelled by the second set of stator magnets. The rotor moves toward the design position as that direction reduces the repelling force.

In another embodiment, the stator 709 comprises a plurality of electromagnets that that are controlled by a stator processor. The stator electromagnets may be arranged axially and act in a similar fashion to the permanent magnets described elsewhere. An individual electromagnet will attract or repel a rotor magnet depending on the polar orientation of the rotor magnet and polarity of the electromagnet. The stator processor may selectively turn stator magnets on by connecting a given stator electro magnet to a voltage cause that causes cause electric current to flow through the given electro-magnet. The stator processor may selectively switch the applied voltage polarity switch the polarity of a given electro-magnet. On one example, the processor turns the stator electromagnets off in standard mode and on in 4-wheel mode to minimize power consumption. In another example, the stator electromagnets may cause the caster frame and wheel 184, 176 to be held a desired orientation that is not aligned with the power base. The stator processor control the magnets similarly to a motor controller for a permanent magnet DC motor or a stepper motor. In another embodiment, the rotor comprises steel or iron elements that are attracted to the applied magnetic fields similar to a solenoid.

In compliance with the statute, the present teachings have been described in language more or less specific as to structural and methodical features. It is to be understood, however, that the present teachings are not limited to the specific features shown and described, since the means herein disclosed comprise various ways of putting the present teachings into effect. While the present teachings have been described above in terms of specific configurations, it is to be understood that the present teachings are not limited to these disclosed configurations. Many modifications and other configurations will come to mind to those skilled in the art to which these teachings pertain, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

The invention claimed is:

1. A caster mount on a vehicle for controlling the rotational position of the caster comprising:
 a first part mounted on the vehicle;
 a second part, including the wheel, is rotatably mounted within the first part, the second part rotating about an axis and having a rotational position with respect to the first part, and the second part having a design position; and
 a magnetic means that applies a magnetic force on the second part, the magnetic force increasing with an angular difference between the rotational position and the design position, the magnetic means comprising:
  a rotary plurality of elements mounted in the second part about the axis; and
  a fixed plurality of elements mounted in the first part, concentric to the rotary plurality of elements, wherein the fixed plurality of elements apply magnetic force on the rotary plurality of elements;
 wherein the rotary plurality of elements comprises a first group of magnets with north poles facing away from the caster wheel and a second group of magnets with north poles facing toward the caster wheel.

2. The caster mount on the vehicle of claim 1 wherein the magnetic force increases proportionately with the angular difference.

3. The caster mount on the vehicle of claim 1 wherein the fixed plurality of elements in the first part are a fixed plurality of permanent magnets.

4. The caster mount on the vehicle of claim 1 wherein the fixed plurality of elements in the first part are a fixed plurality of electro-magnets.

5. The caster mount on the vehicle of claim 4 further comprising a controller connected to the electro-magnets, the controller varying voltage applied to each electro-magnet to drive the second part to a desired rotary position.

6. The caster mount on the vehicle of claim 1 wherein magnetic poles of the rotary plurality of elements and the fixed plurality of elements are axially aligned with the axis of the second part.

7. The caster mount on the vehicle of claim 1 wherein the rotary plurality of elements are oriented radially.

8. The caster mount on the vehicle of claim 1 wherein the rotary plurality of elements comprises two or more rows of magnets.

9. The caster mount on the vehicle of claim 1 wherein the first group of magnets are arranged on a sector of the second part and the second group are arranged on a second sector of the second part.

10. An autonomous delivery vehicle that navigates one or more surfaces and comprising:
a container base that includes:
a controller; and
a camera, the camera having field of view; and
a power base to move the container base across the one or more surfaces, the power base comprising:
a base structure including a second controller;
two clusters disposed laterally on each side of a base, each cluster rotatably connected to the base, each cluster including a front wheel and a back wheel; and
two casters, each caster connected to a caster arm with a caster mount, the caster arms mounted on each side of the base, wherein the casters are disposed partially within the camera's field of view, the caster mount comprising a centering device that urges the casters to a predetermined orientation when the casters are not in contact with the ground;
wherein the centering device comprises:
a first part mounted to the caster arm;
a second part mounted to one of the two casters and rotatably mounted within the first part, the second part rotating about an axis and having a rotational position with respect to the first part, and the second part having a design position; and
a magnetic means that applies a magnetic force on the second part, the magnetic force increasing with an angular difference between the rotational position and the design position, the magnetic means comprising:
a rotary plurality of elements mounted in the second part about the axis; and
a fixed plurality of elements mounted in the first part, concentric to the axis.

11. The autonomous delivery vehicle of claim 10 wherein the magnetic force increases proportionately with the angular difference.

12. The autonomous delivery vehicle of claim 10 wherein the fixed plurality of elements in the first part are a fixed plurality of permanent magnets.

13. The autonomous delivery vehicle of claim 10 wherein the fixed plurality of elements in the first part are electro-magnets.

14. The autonomous delivery vehicle of claim 13 further comprising a controller connected to the electro-magnets, the controller varying the electrical signal to drive the second part to a desired rotary position.

15. The autonomous delivery vehicle of claim 10 wherein the rotary plurality of elements are axially aligned with the fixed plurality of elements.

16. The autonomous delivery vehicle of claim 10 wherein the rotary plurality of elements are oriented radially about the axis.

17. The autonomous delivery vehicle of claim 10 wherein the rotary plurality of elements is comprised of two or more rows of magnets.

18. The autonomous delivery vehicle of claim 10 wherein the centering device comprises:
a first part mounted to the caster arm;
a second part mounted to one of the two casters and the second part rotating about an axis and having a rotational position with respect to the first part, and the second part having a design position; and
a magnetic means that applies a magnetic force on the second part, the magnetic force increasing with an angular difference between the rotational position and the design position.

19. An autonomous delivery vehicle that navigates one or more surfaces and comprising:
a container base that includes:
a controller; and
a camera, the camera having field of view; and
a power base to move the container base across the one or more surfaces, the power base comprising:
a base structure including a second controller;
two clusters disposed laterally on each side of a base, each cluster rotatably connected to the base, each cluster including a front wheel and a back wheel; and
two casters, each caster connected to a caster arm with a caster mount, the caster arms mounted on each side of the base, wherein the casters are disposed partially within the camera's field of view, the caster mount comprising a centering device that urges the casters to a predetermined orientation when the casters are not in contact with the ground;
wherein the centering device comprises:
a first part mounted to the caster arm;
a second part mounted to one of the two casters and the second part rotating about an axis and having a rotational position with respect to the first part, and the second part having a design position; and
a magnetic means that applies a magnetic force on the second part, the magnetic force increasing with an angular difference between the rotational position and the design position.

* * * * *